H. FERGUSON.
TRACTOR HITCH.
APPLICATION FILED DEC. 30, 1919.
1,379,399.
Patented May 24, 1921.
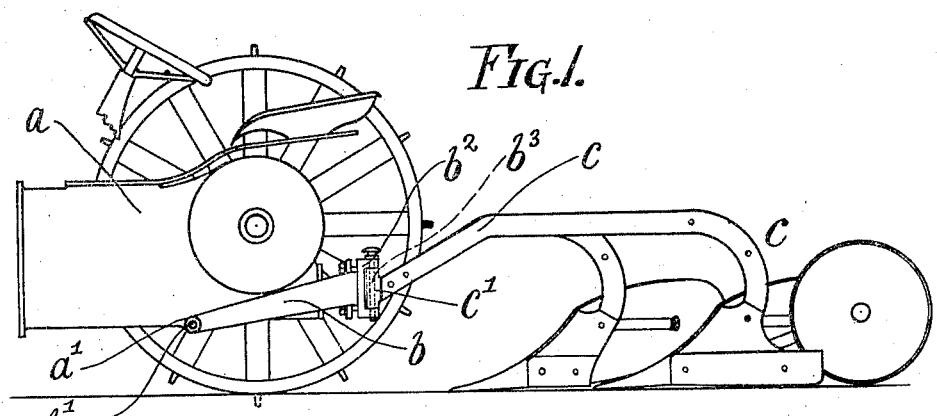
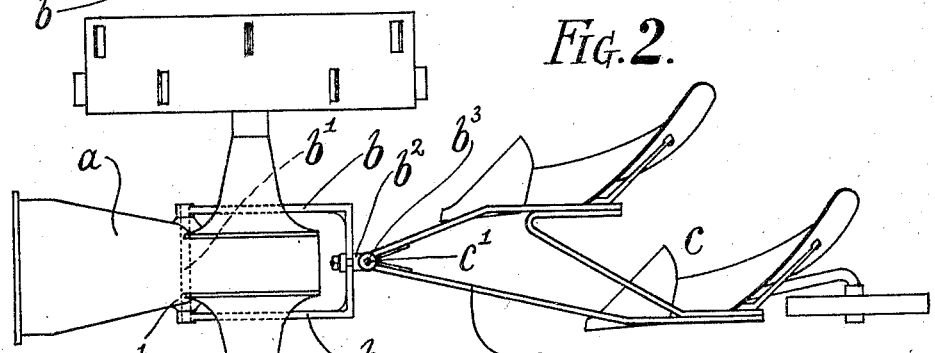
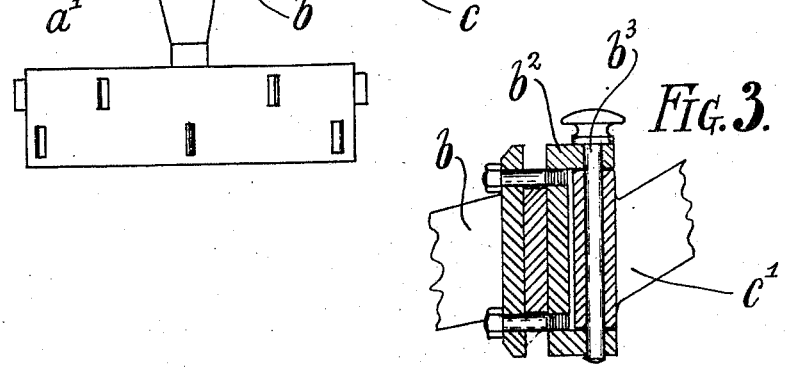
INVENTOR:
Harry Ferguson.
By Diedersheim & Fairbanks
ATTORNEYS.

UNITED STATES PATENT OFFICE.

HARRY FERGUSON, OF BELFAST, IRELAND.

TRACTOR-HITCH.

1,379,399. Specification of Letters Patent. Patented May 24, 1921.

Application filed December 30, 1919. Serial No. 348,438.

*To all whom it may concern:*

Be it known that I, HARRY FERGUSON, of 83 May street, Belfast, Ireland, a subject of the King of Great Britain and Ireland, have invented certain new and useful Improvements in Tractor-Hitches, of which the following is a specification.

This invention relates to a tractor hitch, used for various purposes such, for example, as the haulage of agricultural implements and also for road haulage. It relates more particularly to hitches of the class in which a draft attachment is provided between the tractor and the load, or implement.

At present the point of connection of the draft attachment is behind the rear axle, or driving axle, of the tractor, and, consequently, when the load re-acts on the tractor so as to exert a downward pull at the point of connection of the draft attachment, the tendency is to overturn the tractor and the object of my invention is to overcome this difficulty.

Under my invention the draft attachment is connected to brackets or the like, arranged forwardly of the rear axle, or driving axle, so that the line of draft will fall below the axle, and, therefore, when the load re-acts so as to exert a vertical and downward pull on the tractor, the latter will not be overturned and, further, the attachment is pivotal so that the load or implement has freedom of movement vertically and laterally relatively to the tractor.

Preferably, I provide a draft attachment which is pivotally connected by a horizontal pin, or shaft, supported in brackets or the like arranged at the front of the rear axle, the attachment having, at the end which connects with the load, pivotal or other means permitting the agricultural implement, or other load, lateral freedom of movement in addition to the vertical freedom of movement allowed by the attachment.

A draft attachment as above described assists the steering of the tractor by giving a better distribution of the load on the tractor wheels.

This invention will now be described with reference to the accompanying drawing, whereon:—

Figure 1 is a side elevation, and Fig. 2 a plan, of my invention, as applied to a tractor plow.

Fig. 3 is a sectional detail view at the point of connection of the draft attachment with the plow.

The rear end of a tractor $a$ is shown, fitted with my draft attachment $b$ and attached to a plow $c$.

The draft attachment is arranged as follows:—

In the tractor backbone, or casing, a bearing $a^1$ is provided through which a shaft $b^1$ passes and is turnably supported. The ends of the shaft $b^1$ are fixed in the draft attachment or bail $b$. This draft attachment or bail $b$ is free to move vertically around the bearing $a^1$ as axis.

On the rear of the draft attachment or bail $b$ a forked member $b^2$ is attached, capable of sliding horizontally on the draft attachment or bail $b$ and clamped thereto. A pin $b^3$ connects the implement, or load, to the draft attachment or bail, through the medium of an adapter $c^1$ which allows the implement, or load, horizontal freedom of movement behind the rear axle, the bearing $a^1$ allowing vertical freedom of movement in front of the rear axle.

Should the implement meet an obstruction which might cause a more or less downward pull, this downward pull will tend to keep the front wheels on the ground as the point of connection for vertical movement is in front of, and, below, the axis of the rear wheels, therefore any downward pull caused by the implement or load, is shared by the front wheels of the tractor so that the latter is effectively kept from overturning.

The turning point for lateral movements of the load is arranged behind the rear axle thereby enabling the tractor to turn in a short radius without fouling the rear wheels of the tractor with the implement or load.

Having thus fully described my invention, what I claim and desire to secure by Letters Patent is:—

1. For connecting a tractor, having front and rear axles to an implement, or load, to be hauled thereby, a draft attachment comprising a support arranged forwardly of the rear axle and below the level thereof and a bail connected with the implement, or load, and also pivotally connected with said support so that it has vertical freedom of movement.

2. For connecting a tractor having front and rear axles, to an implement, or load, to be hauled thereby, a draft attachment comprising a support arranged forwardly of the rear axle and below the level thereof, a bail connected with the implement, or load, and also pivotally connected with said support so that it has vertical freedom of movement, and means at the other end of the bail for connecting the implement, or load, therewith so that it has lateral freedom of movement.

3. For connecting a tractor, having front and rear axles, to an implement, or load, to be hauled thereby, a draft attachment comprising a support arranged forwardly of the rear axle and below the level thereof, a bail having its one end pivotally connected with said support and, at its other end a forked member capable of sliding horizontally in the bail and clamped thereto, an adapter on the implement, or load, and a pin which passes through the forked member and the adapter to secure same together.

In testimony whereof I affix my signature in presence of two witnesses.

HARRY FERGUSON.

Witnesses:
 ANDREW HAMILTON,
 HARRY WALTER ALLSOP.